R. Creuzbaur,
Connecting Link,

Nº 63,996.  Patented Apr. 23, 1867.

Fig. 3½.

Witnesses:

Inventor:

R. Creuzbaur,
Connecting Link,
N°63,996. Patented Apr. 23, 1867.

Witnesses:

Inventor:

United States Patent Office.

ROBERT CREUZBAUR, OF NEW YORK, N. Y.

*Letters Patent No. 63,996, dated April 23, 1867.*

---

IMPROVEMENT IN CONNECTING-LINKS AND HOOKS.

---

*The Schedule referred to in these Letters Patent and making part of the same.*

---

TO ALL WHOM IT MAY CONCERN:

Be it known that I, ROBERT CREUZBAUR, of the city and county of New York, State of New York, have invented an Improvement in Connecting-Links and Hooks; and I do hereby declare that the following is a full, clear, and exact description thereof, reference being had to the accompanying drawings, making a part of this specification, in which—

Figures 1, 2, 3, 4, 5, 6, 7, 8, 9, 10, 11, 12, of sheet 1, show my improvement applied to a connecting-link of an S-shape.

Figure 13:
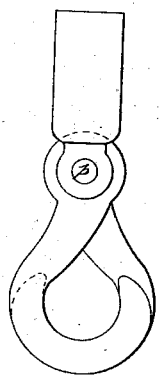
Figure 14:
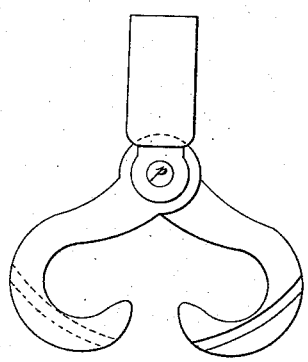
Figure 15:
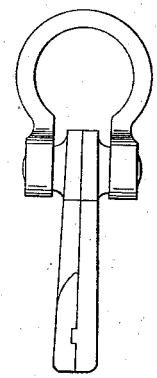

Figures 13, 14, and 15, sheet 2, show my improvement applied to a "sister hook."

Figure 16:
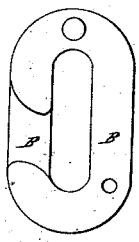
Figure 17:
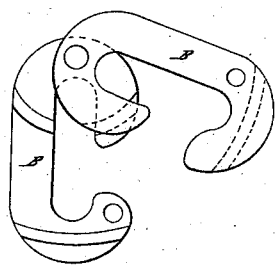
Figure 18:
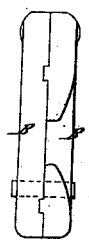

Figures 16, 17, and 18, sheet 2, show the improvement applied to a connecting-link of a C-shape.

Similar letters of reference indicate corresponding parts in the several figures.

This invention relates to an improvement on the patent which was granted on the 13th day of November, 1860, for a universal connecting-link, which consisted in connecting two S-shaped pieces of metal together by means of a central pivot, so that overlapping hooks are produced on each side of said pivot, which form a self-holding link. It also relates to an improvement in overlapping hooks known as "sister hooks," and to all varieties and forms of overlapping hooks and links which are liable to straighten out when subjected to endwise strain exceeding the transverse strength of their parts. The object of my invention is to increase the strength of such links and hooks, from the lateral or transverse resistance of the material, which heretofore formed their base of resistance, to the tensile or cohesive strength of the material used, thereby greatly increasing the strength of the hooks, and links without increasing the quantity of material, as will be hereinafter described. Another object of my invention is to provide for locking connecting-links, so as to prevent their accidental detachment under all circumstances.

To enable others skilled in the art to understand my invention, I will describe its construction and operation.

In the accompanying drawings, sheet 1, I have represented several modes of applying my invention to the S-shaped links, and in sheet 2 I have represented my invention applied to a link which is of two C-shaped sections pivoted together. This form of link I do not desire to claim under the present application for a patent, as I intend making it the subject of a separate application.

Figure 1:
Figure 2:
Figure 3:
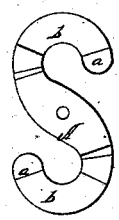
Figure 3:
Figure 4:
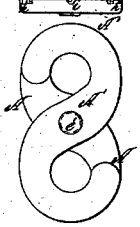
Figure 5:
Figure 6:
Figure 7:
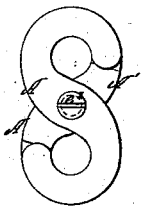
Figure 8:
Figure 9:
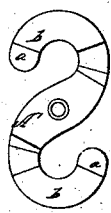
Figure 10:
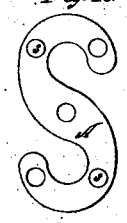
Figure 11:
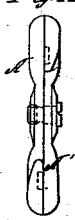
Figure 12:
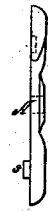

In figs. 1, 2, and 3, A A′ represent two S-shaped plates, which may be made of flat or half-round metal, and bent in the required shape by means of suitable bending and swaging machinery. These links A A′ are constructed with shoulders or stops $a\ a$, and inclined planes $b\ b$ on their impinging sides, which shoulders abut against each other when the two parts of the link are brought together, as represented in fig. 1. These shoulder stops $a$ are plainly represented on the link A, of fig. 3, which corresponds in every particular to the link A′ that is used in connection with it to close the spaces at its ends. These two sections A A′, are put together in reverse order, and pivoted together in the centre by means of a stud, $e$, which has a head formed on one end. This stud is riveted to one of the links, and provided with a flat spring, $f$, that keeps the two parts of the link together, and prevents their casual displacement when in use. The neck of the pivot or stud $e$ is of such length as will allow the parts A A′ to be separated, so that the shoulders of one part will clear the corresponding shoulders on the other part, thus allowing the links to be opened and applied to or removed from the link of a chain or other object. The spring $f$ is kept in place by seating its ends into notches, $g\ g$, which are formed in the link A′, as shown in fig. 1, and also by means of the enlarged head of the pivot $e$, so that this spring forms a very good lock for keeping the two link sections in a proper relation to each other. In figs. 4, 5, and 6, another mode of applying my invention is represented, which consists in forming interlocking shoulders, $h\ h$, which are concentric to the axis of the pivot $e'$, which latter is in this instance a rivet. The shoulders or tongues and grooves $h\ h$ may be swaged upon the S-shaped plates, and then finished in a lathe, the concentric elevators or tongues on one part, A, of the link, being fitted to slide smoothly in corresponding grooves in the other part, A′, of the link, as shown in fig. 5. Such a link may be locked, or prevented from working too loosely, by making a V-shaped elevation, $i$, Figure 3½, on the end of one of the two parts A A′, and a corresponding indentation on the other part. The projection is made with a "centre-punch" after the link is otherwise completely finished. In closing this link the elevation $i$ will spring its halves apart until the projection drops into its recess, when it will retain the two parts in place. The link represented in figs. 7, 8, and 9, is constructed with shoulder abutments on the impinging faces, like the link of figs. 1, 2, and 3, but instead of using a spring, $f$, this link, of figs. 7, 8, and 9, has its two parts made slightly thinner in the middle, around the pivot, so that when put together and brought in forcible contact by means of a screw pivot, $e^2$, they will stand slightly apart, as shown in fig. 8. This will bring a continued bearing upon the screw $e^2$ when it is set up tightly, and will prevent it from becoming casually loose. By pressing the two parts A A' together in the centre, the screw $e^2$ may be loosened with the fingers, without the aid of an instrument. On the other hand, in closing the link, the screw can be set up tightly in the same manner, with the fingers only. In this link the half A, next to the head of the screw $e^2$, works loosely on the latter, without screw-threads, and the other half, A', has screw-threads through it, and also an elevation, $k$, on the outside, in which the bearded or swelled end of the screw $e^2$ works freely. The link which I have shown in figs. 10, 11, and 12, is constructed with studs $s\ s$ on each part, fitting into corresponding depressions in each part. The method of connecting the two parts of this link together and of locking them in place, may be like that shown in fig. 1, where a spring is used, or like that shown in fig. 7, where a screw pivot is used. The same modes as herein described may be adopted for strengthening hooks which are constructed to lap over the other, as shown in figs. 13, 14, and 15, which represent a "sister hook" having its overlapping portions strengthened by forming tongue-and-groove abutments on their impinging sides, which tongue and groove are curved concentric to the axis of the pivot $p$. In figs. 16, 17, and 18, I have represented the tongue-and-groove abutments applied to the impinging faces of C-shaped links B B, which are pivoted together at or near one end. This form of link may be locked by means of a leather thong, or by a screw, as may be desired. I do not confine myself to any definite size, or relative proportions in the construction of the links and hooks, as these will vary according to the material of which they are made, and the strength required of them; nor do I confine myself to any particular mode of utilizing the tensile or cohesive strength of the material used instead of the transverse or lateral strength of the same, as the invention is susceptible of a variety of modifications other than those herein represented.

What I claim as new, and desire to secure by Letters Patent, is—

1. Providing links and hooks with strengthening shoulders, substantially as described.
2. Providing for locking as well as strengthening connecting-links, substantially as described.

ROBERT CREUZBAUR.

Witnesses:
LEWIS C. GREEN, Jr.,
GEO. H. F. GRAY.